INVENTOR
WARREN S. REYNOLDS
JOHN R. TURNER
BY
ATTORNEY

INVENTOR
WARREN S. REYNOLDS
JOHN R. TURNER
BY
ATTORNEY

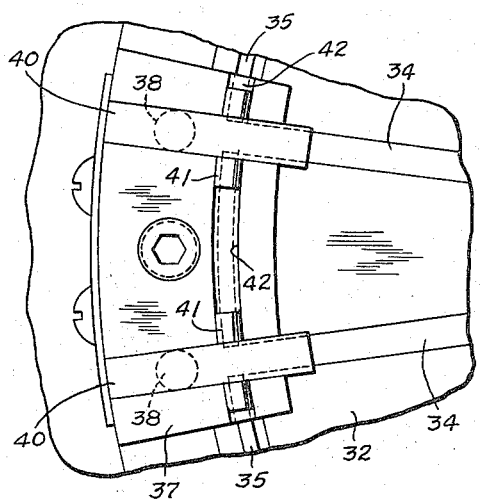
Fig. 8
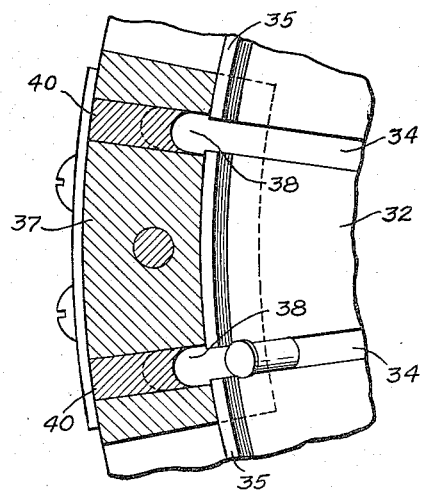
Fig. 9
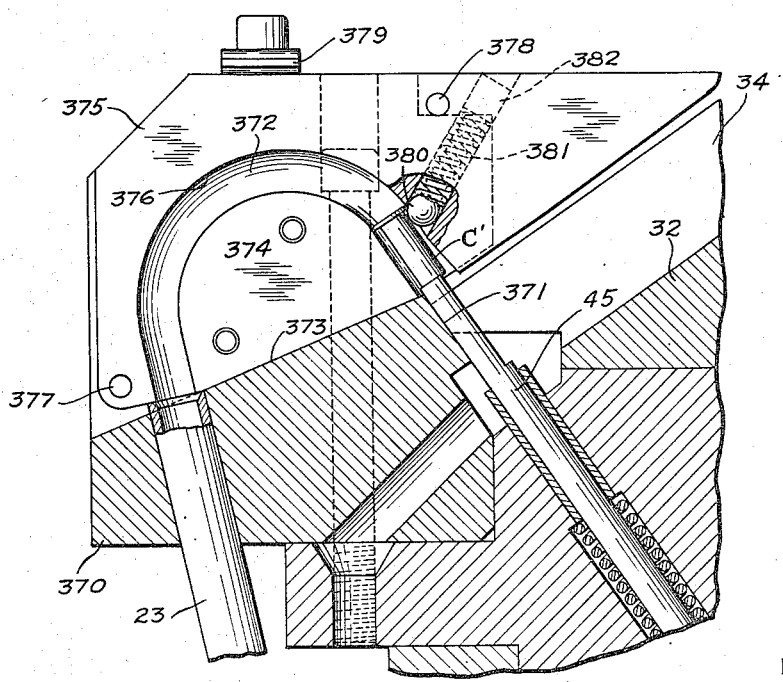
Fig. 10
INVENTOR
WARREN S. REYNOLDS
JOHN R. TURNER
BY
ATTORNEY

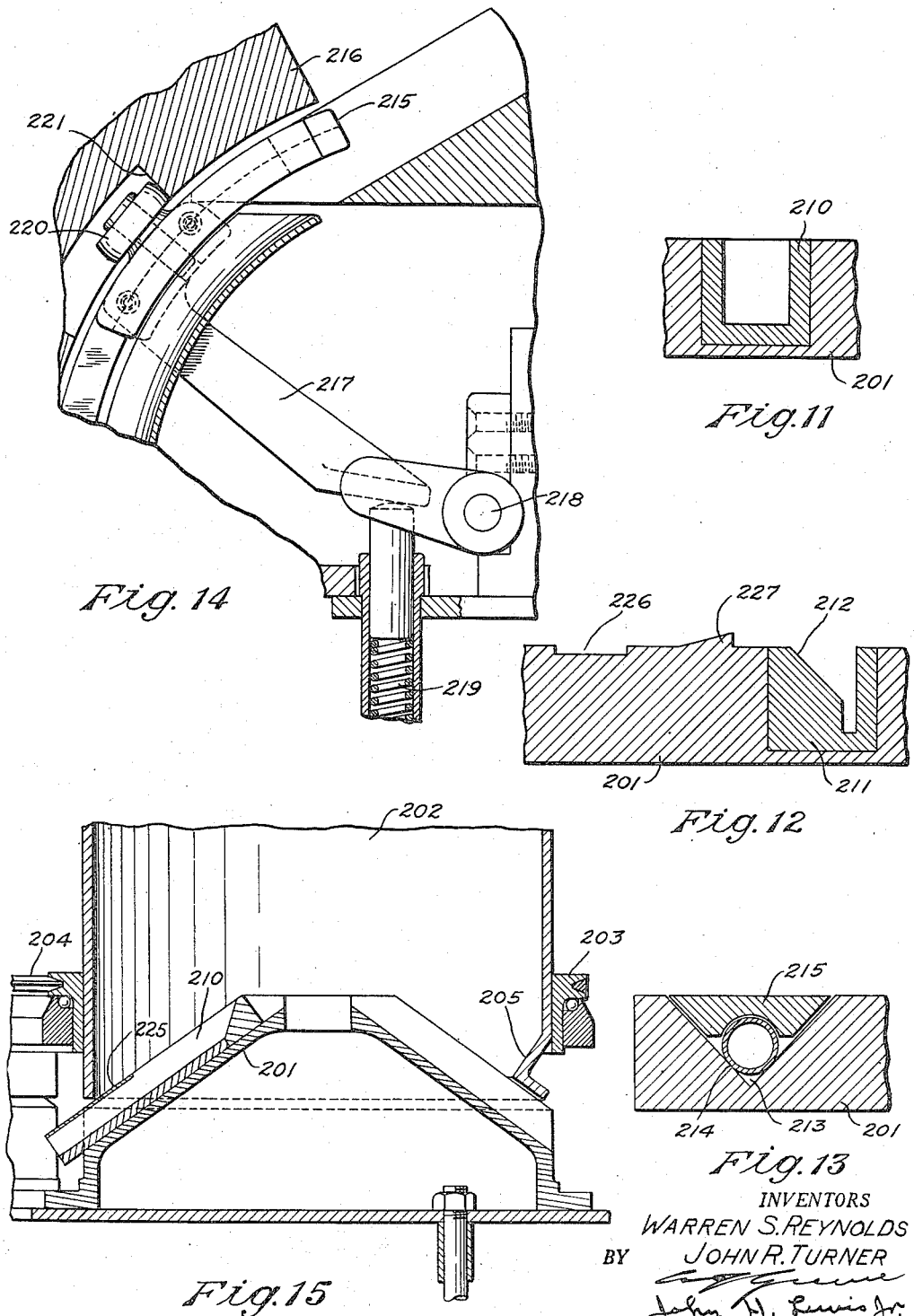

Patented Jan. 16, 1951

2,538,706

UNITED STATES PATENT OFFICE 2,538,706

ARTICLE ARRANGING

Warren S. Reynolds, Bridgeport, and John R. Turner, Stratford, Conn., assignors to Remington Arms Company Inc., Bridgeport, Conn., a corporation of Delaware Application August 26, 1947, Serial No. 770,706

8 Claims. (Cl. 86—46)

This invention relates to article-arranging apparatus, and contemplates improvements in hopper mechanism by which the articles are withdrawn from a mass and delivered in an orderly arrangement.

The invention is particularly adapted to the delivery of articles individually to a continuously moving conveyor chain which conducts them through various stations at which different operations are performed. A machine of this general type is shown in the patent to Johnson, No. 2,403,286, July 2, 1946.

The invention is particularly adapted to withdrawing articles from a hopper and delivering them in an orderly arrangement to tubular passages which move in synchronism with the conveyor chain and from which the articles are removed and placed one at a time in receptacles in the conveyor chain.

In the drawings:

Fig. 8 is a fragmentary horizontal section on the line 8—8 of Fig. 5.

Fig. 9 is a fragmentary section on the line 9—9 of Fig. 5.

Fig. 10 is a fragmentary sectional elevation of a modified form of article or workpiece turn-over device.

Fig. 11 is a fragmentary sectional view illustrating a modified form of hopper bottom groove utilizing an insert.

Fig. 12 is a fragmentary sectional view of a modified hopper bottom and insert.

Fig. 13 is a sectional view of a hopper bottom groove adapted to receive elongated components such as shot shell tubes and provided with a gate adjacent the hopper wall.

Fig. 14 is a diagrammatic showing of a control means for the bridge illustrated in Fig. 13.

Fig. 15 is a diagrammatic showing of a form of the invention in which the hopper bottom is stationary and the hopper body revolves.

Figure 1:
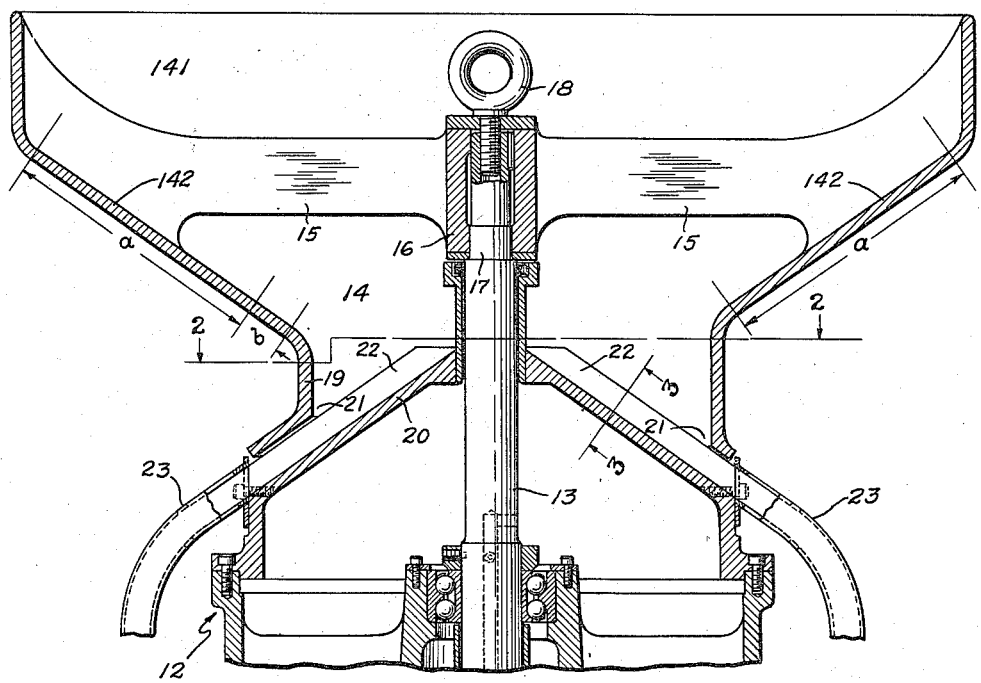
Fig. 1 is a fragmentary sectional elevation of a machine including one form of the improved article-arranging device.
Figure 2:
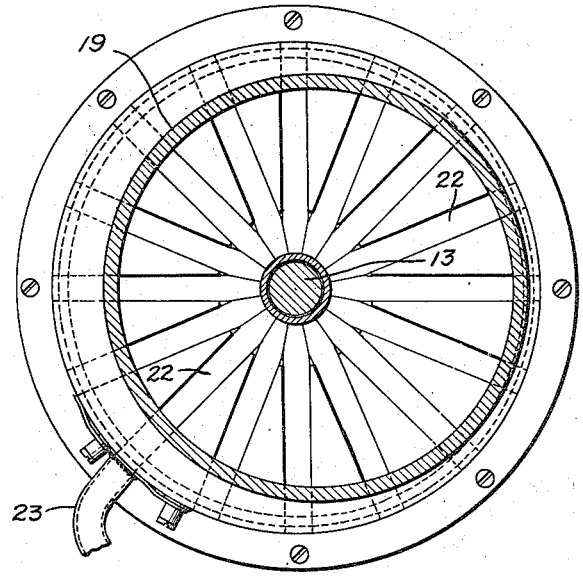
Fig. 2 is a horizontal section, substantially on the line 2—2 of Fig. 1.

The machine illustrated in Figs. 1 to 5 comprises a turret, identified generally by numeral 12, which revolves about a fixed post or standard 13 secured to and projecting upwardly from an appropriate base, not shown. Suitably secured to the upper portion of the fixed standard 13 is a hopper body, identified generally by numeral 14, which may be circular in plan and comprise an upper cylindrical portion 141 and a conical or tapering portion 142. The upper portion of the hopper body may include a web comprising arms 15 which extend inwardly from the body wall and are centrally formed into a boss 16 which receives the upper reduced diameter portion 17 of standard 13. To facilitate handling the rather massive hopper in machine assembly, an upwardly projecting eye 18 may be associated with the boss 16. While the main portion of the fixed hopper body is of conical configuration, its lower portion may comprise a neck 19 of cylindrical section; and, in any event, the hopper comprises a bottom aperture which is closed by the projection thereinto of a generally conical hopper bottom 20, secured to and revolving with the turret 12.

An important feature of the invention resides in the relation of the fixed hopper body 14 to the revolving hopper bottom 20. The arrangement is such that the horizontally circular hopper bottom aperture is eccentric to the conical aperture closing hopper bottom 20, and the hopper wall is so designed as to terminate throughout its periphery in close juxtaposition to the conical surface of the hopper bottom. The depth of the hopper (to the bottom of a V-shaped recess 21) between fixed body and moving bottom thus varies from point to point throughout its periphery; and the length of the conical surface of bottom 20 exposed within the hopper and in contact with the workpieces therein varies accordingly. The sectional view, Fig. 1, shows the extreme of such variation, as well as one way in which the desired eccentricity can be secured. The conical wall 142 is of uniform slope, but, whereas the portion thereof shown at the right of this figure has a length $a$, the portion at the left of the figure is extended inward and downward toward the axis of the cone by the distance $b$. The vertically disposed neck 19 depending from cone 142 intersects the surface of cone 20 at points correspondingly remote from the axis and apex of the cone. The portion of the revolving hopper bottom 20 which is exposed within the hopper varies accordingly, as does the depth of the recess between hopper bottom and hopper body, all as clearly illustrated in Fig. 1. By this means, there is secured an improved and more consistent agitation of the workpieces or components within the hopper. The hopper bottom is slotted for orderly removal of the workpieces, in a manner to be described, and as the hopper bottom revolves within the eccentrically disposed hopper body, workpieces which tend to be carried along in the recess of decreasing depth are lifted and displace pieces above them, giving to substantially the entire mass a slow but constant movement which greatly facilitates the orderly arrangement of the workpieces in the hopper bottom grooves.

Figure 3:
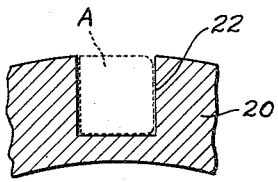
Fig. 3 is a detail section, substantially on the line 3—3 of Fig. 1.
Figure 4:
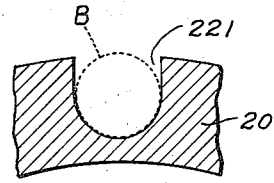
Fig. 4 is a detail similar to Fig. 3 but showing a modified form of hopper bottom groove.

The hopper bottom 20 comprises at least one and preferably a series of radial grooves 22 of configuration and dimension determined by the configuration and dimensions of particular workpieces. The machine illustrated in Figs. 1 to 5 is designed for the handling of cylindrical cup-shaped blanks to be formed into shot shell heads. Blanks for the heads of shot shells of a given size or gauge may be of either of two heights—a "low base" cup has a height less than its diameter, while a "high base" cup has a height greater than its diameter. The hopper bottom grooves are of such width as to receive the shortest dimension of the workpiece to be transferred, but not to receive the longest dimension. A cross-section of a hopper bottom groove for the reception of a low base cup A is illustrated in Fig. 3. The height of such cups is less than their diameter, hence they can be received in the groove only in side-by-side relation, with their axes transverse to the groove. The groove is of rectilinear configuration and of such depth that the workpieces do not project upwardly and outwardly therefrom but are wholly contained within the groove and can thus pass under the juxtaposed stationary hopper wall. Fig. 4 illustrates hopper bottom grooves for the reception of cylindrical cups B having a length greater than their diameter. Such cups can be received in the grooves only in end-to-end relation, with their axes parallel to the length of the groove, the width of the groove being only slightly greater than cup diameter and less than cup length. The lower part of the groove is of arcuate configuration, and its depth at its center is slightly greater than article diameter.

The grooved hopper bottom 20 extends downwardly and outwardly beyond the juxtaposed margin of the hopper body wall, so that articles are constantly removed from the hopper body through such grooves in orderly columns in the grooves. Associated with the peripheral portion of the revolving hopper bottom are suitable means for delivering the articles therefrom to the tubular chutes or conveyors through which the articles move, preferably by gravity, to such receiving, delivery and transfer devices as may be desirable. As shown in Fig. 1, each groove 22 is in communication with a tubular member 23, suitably secured to the margin of hopper bottom 20. Devices for removing articles from tubular members such as 23 to receptacles in a conveyor chain are shown in the copending application of Yost, Serial No. 722,251, filed January 15, 1947.

Other forms of the invention are shown in Figs. 5 to 10, which show devices for the aligning of rimmed or headed and relatively long pieces (e. g., rimfire shells) in a preferred orientation.

Figure 5:
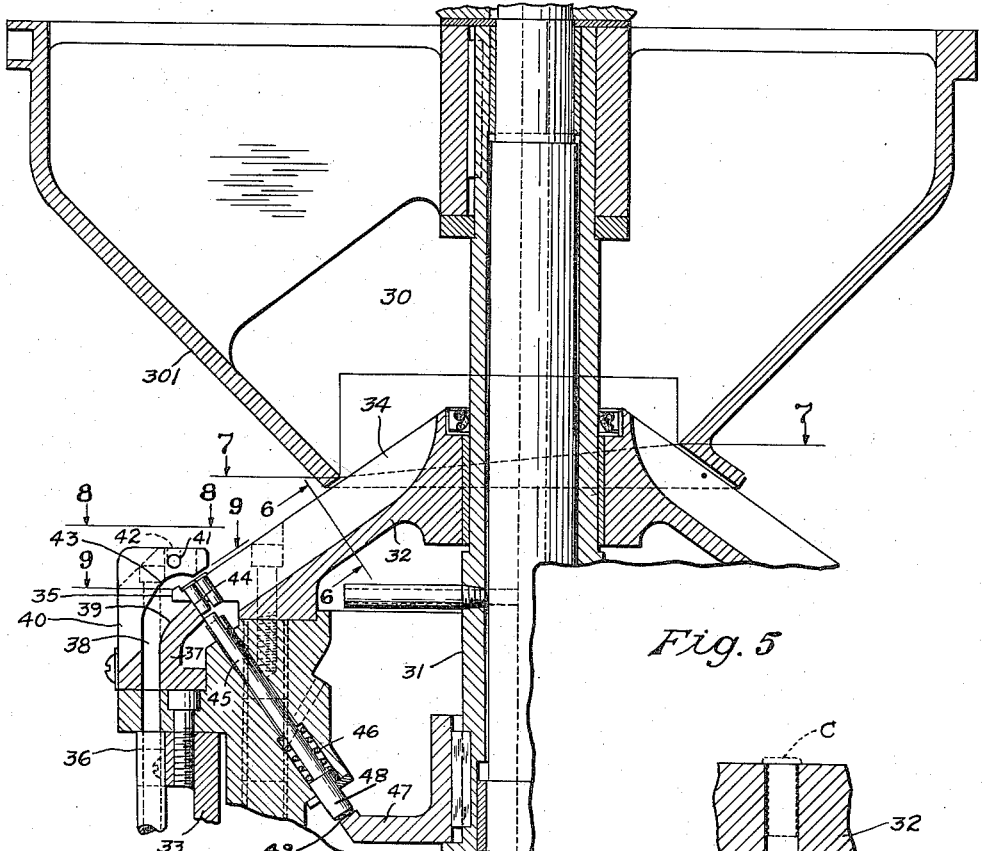
Fig. 5 is a fragmentary sectional elevation of a machine embodying a modification of the invention.

The hopper 30 is supported on a fixed standard 31, and its bottom aperture is closed by a frusto conical base 32 which revolves with a turret 33. The eccentric relationship of the hopper to the cone is secured by progressively varying the angle of inclination of the hopper wall 301 throughout its periphery. The section Fig. 5 shows the maximum and minimum angles of inclination of such wall, and the corresponding maximum and minimum exposures of the surface of conical hopper bottom 32.

Figure 6:
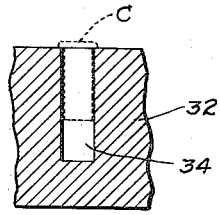
Fig. 6 is a detail section on the line 6—6 of Fig. 5.
Figure 7:
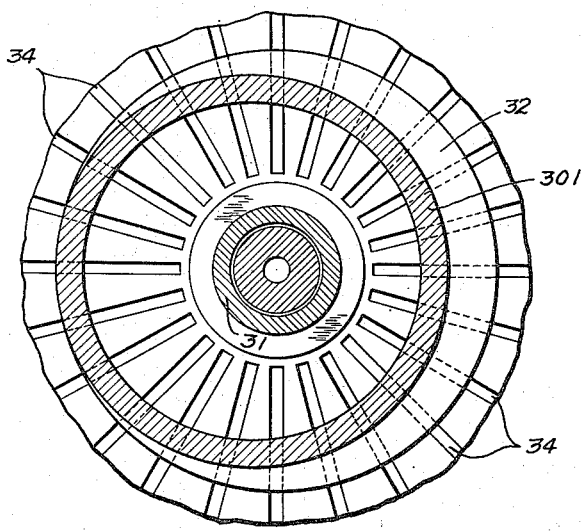
Fig. 7 is a substantially horizontal section on the line 7—7 of Fig. 5.

The frusto conical hopper bottom 32, as before, comprises radial slots or grooves 34 of such width as to easily receive the shortest dimension of the headed or flanged workpiece. The position of such a piece C in one of the grooves 34 is shown in Fig. 6. The body thereof lies fully within the groove 34 while a projecting head rests upon the adjacent surface of the cone. Suitable clearance is provided between the margin of the hopper wall 301 and the surface of the cone to enable workpieces in this position to pass under the hopper wall.

The peripheral portion of the hopper bottom 32 is provided with an upstanding flange 35, which is slotted through in alignment with groove 34 to form a series of lugs or abutments which are engaged by the rim or flange of the lowermost shell in each of the grooves 34 and stop its outward movement. Means are provided for removing the shells, one at a time, from contact with these abutments into a tubular passage 36, which conducts them to devices by which they are inserted in a conveyor chain moving in synchronism with the turret. One means for this purpose is illustrated in Figs. 5, 8 and 9, and described as follows:

To the adjacent portion turret 33 are secured a series of apertured blocks 37. For convenience of manufacture, each block is preferably arranged to extend across two of the hopper bottom slots 34 and comprises two passageways 38 in circumferential alignment with said slots or grooves 34. Likewise for convenience of manufacture, blocks 37 are slotted or milled through their radial dimension on the line 39 and the slot is closed with a plate 40 comprising laterally extending trunnions 41 received in grooves 42 in the upper portion of the blocks. The inner surface 43 of each plate 40 is formed in such a configuration that, acting in conjunction with the abutments 35 and the marginal surface 44 of block 37, each shell, in turn, when given an upward movement by means to be described, is inverted and dropped head-down into the tubular passage 36.

The means for displacing the outermost shell upward to clear the abutments 35 and block surface 44 and initiate its inverting and downward movement may comprise a plunger 45 mounted in the turret in alignment with the lowermost shell in each of the grooves 34 and urged downwardly by suitable means such as a spring 46. Plungers 45 may be connected in pairs by crossheads 48 with which are associated cam followers 49. Secured to standard 31 is a cam 47 in alignment with the lower and inner ends of cam followers 49, said cam comprising one rise of such configuration as to displace one shell from each groove 34 into the turnover blocks in each revolution of the turret. It will be noted that a single cam 47 acts on each of the several plungers 45, so that during each revolution of the turret one shell is displaced from each of the grooves 34 and falls head-down through tubular passage 36 into position for further controlled movement, such as movement into a receptacle associated with a conveyor chain. Means for this purpose will be made the subject of a separate application.

A modified form of shell turn-over device is illustrated in Fig. 10. The flange on the periphery of the revolving hopper bottom 32 is omitted, and the turn-over block 37, heretofore described, is replaced by a modified block 370. The lowermost shell in hopper grooves 34 comes to rest against a face 371 of block 370. Formed in the block 370 is a U-shaped passage 372, which passage may be conveniently secured by milling a slot in block 370 to the line 373 and securing in the milled slot a plate 374 having a curvilinear surface which forms one margin of the passage 372. Within the milled slot is suitably secured a filler piece 375 having a curvilinear surface 376, forming the opposite side of passage 372. For convenience of manufacture and access, filler pieces 375 may be hung on pivot pins 377 and provided with laterally extending studs or trunnions 378 received in grooves in the top of the block. As before, each block 370 preferably embodies two passages 372, and the two filler pieces 375 are latched in place by a rotatable spring clip indicated at 379. Each U-shaped passage 372 communicates with a tubular member 23, above-described. Plungers 45, as heretofore described, are adapted to lift the lowermost shell in hopper groove 34 to the position C', in which position the shell is retained by a suitable retainer such as a ball 380 urged inwardly by a spring 381 held by an abutment 382; the parts 380, 381 and 382 being housed in an aperture in filler piece 375. As successive shells are moved to the C' position, the shell already in this position is lifted to the top of the U-passage 372 and falls head-down through the tubular member 23.

Several modifications of the various inventions are illustrated in Figs. 11 to 15, inclusive. Considering first the relation of the hopper opening to the conical hopper base by which different lengths of the hopper bottom are exposed within the hopper on different radii, it will be obvious that the rotating element may be the hopper body instead of the hopper bottom. Such an arrangement is illustrated in Fig. 15. The conical base 201 is fixed while the hopper body 202 is mounted for rotation, and is rotated by any suitable means such as a pulley 203 driven by a belt 204. The body 202 revolves about the axis of conical bottom 201 but the hopper bottom opening is eccentric with respect to the bottom, the eccentricity being provided, in this illustrative embodiment, by appropriately sloping a portion of the body wall adjacent the bottom as illustrated at 205.

As above described, the hopper bottom grooves are of such width as to receive the shortest dimension of the workpiece. To adapt a particular hopper bottom for the interchangeable handling of different shortest dimensions, the hopper bottom may be constructed as illustrated in Fig. 11. The bottom 201 comprises as a part thereof large and preferably rectangular grooves in which are placed trough-like inserts 210 having the interior dimensions of a particular workpiece. The insert of Fig. 11 is adapted to receive ordinary shot shell filler wads. Fig. 12 shows an insert 211 adapted to receive a cardboard disk such as an over-powder wad, which is of the same diameter but of substantially less thickness than the filler wad. To facilitate entrance of such thin disks, the leading edge of the groove may be cut away, as shown at 212, and to avoid damage to the wads by jamming adjacent the hopper wall the lower end portion of the insert may be provided with a cover, 225 (Fig. 15). Movement into the groove of some workpieces such as shot shell wads may be further facilitated by providing the approach surface of the hopper bottom with shallow grooves 226 or projections 227 (Fig. 12) adapted to initiate a tumbling movement of the pieces.

Fig. 13 illustrates a groove adapted to elongated components, such as tubular shot shell bodies. The groove 213 is of a wide V-configuration, the width at the top being comparable with the length of the bodies to be assorted. It has been found that such elongated tubes readily arrange themselves in column in the bottom of such a groove, as shown at 214. In juxtaposition to the hopper body, each groove is bridged by a member 215, which prevents the escape of tubes from the hopper except in the position indicated at 214. The hopper body and bottom being relatively eccentric, it is necessary that the bridge 215 follow the in and out movement of the body wall along the base. One means for accomplishing this is shown in Fig. 14. The bridge 215 extends outwardly beyond the hopper body wall 216 and is rigidly joined to a lever 217 pivoted to the frame at 218 and urged clockwise by a spring 219. Bridge 215 carries a cam roll 220 which is urged by spring 219 into contact with a cam surface 221 on the body 216. The bridge is thus at all times located beneath the adjacent portion of the body.

The specific embodiments of the inventions above described and shown in the drawings are merely illustrative, the inventions obviously being susceptible to embodiment in other forms.

What is claimed is:

1. Apparatus for securing an orderly arrangement of workpieces from a heterogeneous mass of such pieces comprising a fixed hopper body having a bottom aperture, and a revolving hopper bottom of generally conical shape projecting into said aperture with portions of the surface thereof in juxtaposition to the margin of said aperture, said aperture being eccentric with respect to said conical bottom.

2. Apparatus for securing an orderly arrangement of workpieces from a heterogeneous mass of such pieces comprising a fixed hopper body having a bottom aperture, and a revolving hopper bottom of generally conical shape projecting into said aperture with portions of the surface thereof in juxtaposition to the margin of said aperture, said aperture being eccentric with respect to said conical bottom, the relative configurations of said hopper body and said hopper bottom being such as to form therebetween a recess of varying depth.

3. Apparatus for securing an orderly arrangement of workpieces from a heterogeneous mass of such pieces comprising a fixed hopper body having a bottom aperture, and a revolving hopper bottom of generally conical shape projecting into said aperture with portions of the surface therof in juxtaposition to the margin of said aperture, said aperture being eccentric with respect to said conical bottom, the relative configurations of said hopper body and said hopper bottom being such as to expose different depths of said conical hopper bottom in different circumferential positions.

4. Apparatus for securing an orderly arrangement of workpieces from a heterogeneous mass of such pieces comprising a fixed hopper body having a bottom aperture, and a revolving hopper bottom of generally conical shape projecting into and substantially closing said aperture, said aperture being eccentric with respect to said conical bottom, the relative configurations of said hopper body and said hopper bottom being such as to expose different depths of said conical hopper bottom in different circumferential positions, there being in said revolving hopper bottom a plurality of radial grooves of transverse dimensions equal to but not substantially greater than the shortest dimension of the workpieces, whereby said workpieces are arranged in order in said grooves.

5. Apparatus for securing an orderly arrangement of workpieces from a heterogeneous mass of such pieces comprising a hopper body having a bottom aperture, a hopper bottom of generally conical configuration eccentrically disposed with respect to said aperture and projecting into said aperture with portions of the surface thereof in juxtaposition to the margin of said aperture, and means for effecting relative rotation of said hopper body and hopper bottom.

6. Apparatus according to claim 5 in which said hopper bottom is provided with radial workpiece receiving grooves and extends outwardly beyond the wall of said hopper body to deliver workpieces in order from said grooves.

7. Apparatus according to claim 6 in which one margin of each groove is cut away to form an approach angle which facilitates the entrance of workpieces into said grooves.

8. Apparatus according to claim 6 in which said grooves are of generally V-configuration and of a depth exceeding the transverse dimension of elongated workpieces, and a workpiece straddling bridge in each groove adjacent the hopper wall.

WARREN S. REYNOLDS.
JOHN R. TURNER.

REFERENCES CITED

The following references are of record in the file of this patent:

UNITED STATES PATENTS

| Number | Name | Date |
| --- | --- | --- |
| 477,327 | Gribben | June 21, 1892 |
| 559,391 | Lafrance | May 5, 1896 |
| 699,565 | Pugh | May 6, 1902 |
| 699,754 | Graham | May 13, 1902 |
| 962,928 | Stewart | June 28, 1910 |
| 986,777 | Standish | Mar. 14, 1911 |
| 1,922,425 | Evans | Aug. 15, 1933 |

FOREIGN PATENTS

| Number | Country | Date |
| --- | --- | --- |
| 17,443 | Norway | Apr. 28, 1908 |